(12) United States Patent
Nandi et al.

(10) Patent No.: US 10,569,508 B2
(45) Date of Patent: Feb. 25, 2020

(54) MULTILAYER FACER

(71) Applicant: JOHNS MANVILLE, Denver, CO (US)

(72) Inventors: Souvik Nandi, Highlands Ranch, CO (US); Glenda B Bennett, Toledo, OH (US); Thomas Matthews, Liberty Center, OH (US)

(73) Assignee: Johns Manville, Denver, CO (US)

( * ) Notice: Subject to any disclaimer, the term of this patent is extended or adjusted under 35 U.S.C. 154(b) by 186 days.

(21) Appl. No.: 15/626,495

(22) Filed: Jun. 19, 2017

(65) Prior Publication Data

US 2018/0361712 A1 Dec. 20, 2018

(51) Int. Cl.
*B32B 17/06* (2006.01)
*B32B 5/02* (2006.01)
(Continued)

(52) U.S. Cl.
CPC .......... *B32B 17/06* (2013.01); *B29C 37/0025* (2013.01); *B29C 70/36* (2013.01); *B32B 5/022* (2013.01); *B32B 5/26* (2013.01); *B32B 13/14* (2013.01); *B32B 21/02* (2013.01); *B32B 21/10* (2013.01); *E04C 2/16* (2013.01); *B29K 2105/06* (2013.01); *B29K 2309/08* (2013.01); *B29L 2031/10* (2013.01); *B32B 2255/02* (2013.01); *B32B 2255/26* (2013.01); *B32B 2260/023* (2013.01); *B32B 2260/046* (2013.01); *B32B 2262/10* (2013.01); *B32B 2262/101* (2013.01); *B32B 2262/108* (2013.01); *B32B 2264/10* (2013.01); *B32B 2264/104* (2013.01);

(Continued)

(58) Field of Classification Search
CPC . B29C 37/0025; B29C 70/36; B29K 2105/06; B29K 2309/08; B29L 2031/10; B32B 13/14; B32B 17/06; B32B 21/02; B32B 21/10; B32B 2255/02; B32B 2255/26; B32B 2260/023; B32B 2260/046; B32B 2262/10; B32B 2262/101; B32B 2262/108; B32B 2264/10; B32B 2264/104; B32B 2307/3065; B32B 2307/50; B32B 2307/712; B32B 2307/724; B32B 2419/00; B32B 2607/00; B32B 5/022; B32B 5/26; E04C 2/10
See application file for complete search history.

(56) References Cited

U.S. PATENT DOCUMENTS

| 2007/0141931 A1 | 6/2007 | Nandi et al. |
| 2016/0145785 A1 | 5/2016 | Grove et al. |

*Primary Examiner* — Arti Singh-Pandey
(74) *Attorney, Agent, or Firm* — Robert D. Touslee

(57) ABSTRACT

A glass facer for a constructions board includes a first non-woven layer of coarse fibers and a second non-woven layer of coarse fibers and microfibers. The glass facer also includes a binder that simultaneously binds or adheres the coarse fibers of the first non-woven layer together, the coarse fibers and the microfibers of the second non-woven layer together, and the first non-woven layer to the second non-woven layer. The first non-woven layer has a porosity and air permeability that enables the first non-woven layer to absorb a material of the construction board when the glass facer is positioned atop the construction board during manufacture of the construction board. The second non-woven layer is configured to block the material of the construction board from passing through the glass facer to an exterior surface of the second non-woven layer so that the material is not externally visible.

12 Claims, 4 Drawing Sheets

(51) Int. Cl.
B29C 70/36 (2006.01)
B29C 37/00 (2006.01)
B32B 13/14 (2006.01)
B32B 21/10 (2006.01)
B32B 5/26 (2006.01)
B32B 21/02 (2006.01)
E04C 2/16 (2006.01)
B29K 105/06 (2006.01)
B29K 309/08 (2006.01)
B29L 31/10 (2006.01)

(52) U.S. Cl.
CPC ... *B32B 2307/3065* (2013.01); *B32B 2307/50* (2013.01); *B32B 2307/712* (2013.01); *B32B 2307/724* (2013.01); *B32B 2419/00* (2013.01); *B32B 2607/00* (2013.01)

MULTILAYER FACER

BACKGROUND OF THE INVENTION

The disclosure generally relates to facers that may be coupled with a construction board.

Facers may be mats or paper that attach to construction boards to enhance their aesthetic appeal and/or for other purposes. For example, facers are typically attached to construction boards for processability, such as by containing the core material within a defined space and through the manufacturing process. Glass mat facers are commonly attached to construction boards to provide additional mechanical strength, protection against weather (e.g., UV, rain, snow, etc.), and the like. Glass facers may be attached to gypsum or polyisosynurate boards to provide improved flame resistance compared to paper facers. In some instances, the facer may be attached to a portion of the board that faces the room's interior to enhance the aesthetic appearance of the board within room. The construction boards are typically used for extended periods, so the facer products attached to the boards should be durable. There is a constant need for improved facer products that may be attached to boards.

BRIEF SUMMARY OF THE INVENTION

The embodiments described herein are directed to fiber mat facers that may be coupled with constructions boards, such as ceiling panels, drywall boards, polyisocyanurate foam boards, etc. to provide an aesthetically appealing look. According to one aspect, a glass facer for a construction board includes a first layer of non-woven web of fibers and a second layer of non-woven web of fibers. The first layer of non-woven web of fibers includes a first group of coarse glass fibers have an average fiber diameter from about 8 µm to about 25 µm. The second layer of non-woven web of fibers includes a second group of coarse glass fibers mixed with glass microfibers having an average diameter from about 0.5 µm to about 6 µm. A binder is employed to simultaneously bind the first group of coarse fibers in the first layer together, the second group of coarse glass fibers and glass microfibers in the second layer together, and the first layer to the second layer. The first layer of non-woven web of fibers is configured to absorb a material of the construction board when the glass facer is positioned atop the construction board and the second layer of non-woven web of fibers is configured to block the material of the construction board from passing through the glass facer to an exterior surface of the second layer of non-woven web of fibers.

In some embodiments, the second group of coarse fibers have an average fiber diameter from about 8 µm to about 25 µm. The first group of coarse fibers and the second group of coarse fibers may have the same average diameter. In some embodiments, the glass facer includes a coating that is applied atop the exterior surface of the second layer. The coating may be a water resistant coating, a fire-resistant coating, an abuse-resistant coating, etc. In a specific embodiment, the first group of coarse glass fibers may have an average fiber diameter of about 13 µm and/or the second group of coarse glass fibers may have an average fiber diameter of about 11 µm. The glass microfibers may have an average fiber diameter of about 3 µm.

The second group of coarse fibers may be between about 50 wt. % and 100 wt. % of the total weight of the second layer and/or the glass microfibers may be between about 80 wt. % and 99 wt. % of the total weight of the second layer. The first layer may be between 30 and 95 percent of a thickness of the glass facer and the second layer may be between 5 and 50 percent of the thickness of the glass facer. The first group of coarse glass fibers, the second group of glass coarse fibers, and/or the glass microfibers may be glass fibers selected from the group consisting of E glass, C glass, T glass, sodium borosilicate glass, and mixtures thereof.

According to another aspect, a construction board includes a core layer and a glass facer coupled to the core layer. The glass facer includes a first layer of non-woven web of fibers comprising a first group of coarse glass fibers have an average fiber diameter from about 8 µm to about 25 µm, and a second layer of non-woven web of fibers comprising a second group of coarse glass fibers mixed with glass microfibers having an average diameter from about 0.5 µm to about 6 µm. The glass facer also includes a binder that simultaneously binds the first group of coarse fibers in the first layer together, the second group of coarse glass fibers and glass microfibers in the second layer together, and the first layer to the second layer. A material of the core layer is disposed within the first layer of non-woven web of fibers and is partially disposed within the second layer of non-woven web of fibers without penetrating through the second layer an exterior surface of the second layer.

The core layer may include polyisocyanurate, glass wool, mineral wool, fiberboard, gypsum, etc. The glass facer may include a coating that is positioned atop and coupled to the second layer. The coating may be a water resistant coating, a fire-resistant coating, an abuse-resistant coating, etc. The second group of coarse fibers may be between about 50 wt. % and 100 wt. % of a total weight of the second layer. The glass microfibers may be between about 80 wt. % and 99 wt. % of a total weight of the second layer. The first layer may be between 30 and 95 percent of a thickness of the glass facer and the second layer may be between 5 and 50 percent of the thickness of the glass facer. The material of the core layer may be distributed fully through a thickness of the first layer of non-woven web of fibers.

According to another aspect, a method of forming a multi-layer fiber mat includes pouring or discharging a first fluid mixture onto a porous belt or surface. The first fluid mixture includes a first fluid and a first group of fibers that are homogenously mixed or dispersed within the first fluid. The method also includes draining or removing the first fluid from the first fluid mixture as the first fluid mixture is poured or discharged onto the porous belt or surface in order to form a layer of the first group of fibers atop the porous belt or surface. The method further includes pouring or discharging a second fluid mixture onto the porous belt or surface atop the layer of the first group of fibers as the first fluid is drained or removed from the first fluid mixture. The second fluid mixture includes a second fluid and a second group of fibers that are homogenously mixed or dispersed within the second fluid. The method additionally includes draining or removing the second fluid from the second fluid mixture as the second fluid mixture is poured or discharged onto the porous belt or surface in order to form a layer of the second group of fibers atop the porous belt or surface and atop the layer of the first group of fibers so that the layer of the second group of fibers and the layer of the first group of fibers are simultaneously formed. The method additionally includes applying a binder to the layer of the first group of fibers and the layer of the second group of fibers in order to simultaneously bind the layer of the first group of fibers and the layer of the second group of fibers together and of bind the first group of fibers and the second group of fibers together.

The second fluid mixture may be poured or discharged onto the porous belt or surface within 30 inches of where the first fluid mixture is poured or discharged onto the porous belt or surface. In other embodiments, the second fluid mixture may be poured or discharged onto the porous belt or surface within 12 inches or within 6 inches of where the first fluid mixture is poured or discharged onto the porous belt or surface. The binder may be the only binder that is applied to the first group of fibers and the second group of fibers. The multi-layer fiber mat does not include a binder concentration at an interface between the layer of the first group of fibers and the layer of the second group of fibers. The binder is typically homogenously or uniformly dispersed within the multi-layer fiber mat.

The first group of fibers may consist of coarse glass fibers having an average fiber diameter of between 8 μm and 25 μm. The second group of fibers may consist of a combination of coarse glass fibers having an average fiber diameter of between 8 μm and 25 μm and glass microfibers having an average fiber diameter of between 0.5 μm and 6 μm. In some embodiments, the method may additionally include applying a coating atop the layer of the second group of fibers. The coating may be applied atop the layer of the second group of fibers upon the second group of fibers filtering out a component of the binder so that the component remains on an exterior surface of the layer of the second group of fibers. In some embodiments, the method may additionally include positioning the multi-layer fiber mat atop a construction board during formation of the construction board.

BRIEF DESCRIPTION OF THE DRAWINGS

Various features, aspects, and advantages of the present invention will be better understood when the following detailed description is read with reference to the accompanying figures in which like characters represent like parts throughout the figures, wherein.

DETAILED DESCRIPTION OF THE INVENTION

Figure 1:
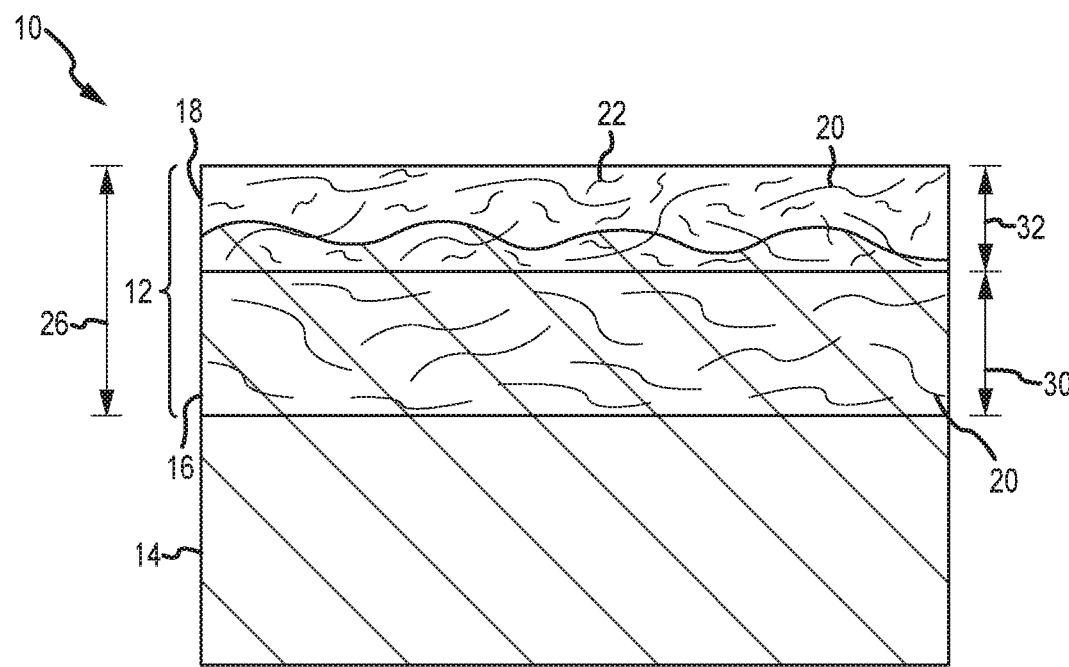
FIG. 1 is a cross-sectional view of a facer.

The ensuing description provides exemplary embodiments only, and is not intended to limit the scope, applicability, or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Fiber Mat Facer

The embodiments below disclose fiber mat facers that may be coupled with constructions boards, such as ceiling panels, drywall boards, polyisocyanurate foam boards, etc. to provide an aesthetically appealing look. The fiber mat facers discussed below include multiple layers of glass fibers made in a single step or process. In other words, the layers of the facers discussed below are not separately formed and then combined in a later stage or process (i.e., separately made and then bonded together). Rather, the layers are formed simultaneously, which results in a facer that functions as a single layer in terms of structure and integrity despite having different fiber compositions and layer densities. Accordingly, the facers discussed may be produced at lower cost and in less time.

In addition to including multiple layers, the facers discussed below may include a coating. The coating may be aesthetic or add desired properties to the construction board. For example, the coating may provide a flat, gloss-free surface. The coating may also enable a non-directional visual appearance, meaning that the appearance does not depend on the angle in which the fiber mat facer is viewed. In some embodiments, the coating may be a fire retardant coating, water repellent coating, washable coating, impact-resistant coating, scratch-resistant coating, soil resistant coating, or a combination thereof.

One or more of the layers may include a blend of differently sized glass fibers. The differently sized glass fibers form layers of different densities within the facer. For example, one or more layers may include both coarse and microfibers. Furthermore, some embodiments may include one or more layers of differently sized coarse fibers, differently sized microfibers, or a combination thereof. The coarse or larger diameter fibers may range in size between about 8 and about 25 μm, and small diameter fibers or microfibers may range in size between about 0.5 and 6 μm. In a more specific embodiment, the coarse or larger diameter fibers may range in size between about 8 and about 16 μm, and more commonly between about 11 and 16 μm. The small diameter fibers or microfibers may range in size between about 1 and 6 μm, and more commonly between 2 and 4 μm.

By including layers with different densities, the non-woven fiber mat facilitates bonding between the core material and the facer by absorbing the core material of the construction board. Simultaneously, the more dense layer of the non-woven fiber mat (e.g., layer with microfibers) blocks the core material of the construction material from passing through (e.g., bleeding through) the facer. Thus, the non-woven fiber mat may form a construction board that is aesthetically pleasing and uniform in appearance. Conventional facers often employ a coating on the exterior surface that prevents bleed through of the core material and/or that masks any bleed through of the core material that occurs. The facers described herein are able to prevent bleed through of the core material without requiring the use of a coating on the exterior surface of the facer. Further, a coating on the exterior surface is not needed since bleed through of the core material will not be present or visible on the exterior surface of the facer.

In a specific embodiment, the larger diameter fibers may be about 13 μm diameter fibers and the microfibers may be about 3 μm in diameter. The facer includes at least one binder that bonds the large diameter fibers and microfibers together to form the fiber mat. The binder may be water repellant and/or include a water repellant additive such as a stearylated melamine water repellant.

FIG. 1 is a cross-sectional view of a construction board 10 with a facer 12 (e.g., glass facer) and a core material 14. The core material 14 may be gypsum, magnesium oxide, polyisocyanurate, polystyrene, etc. As illustrated, the facer 12 includes multiple layers (e.g., 1, 2, 3, 4, 5, or more). These layers are formed in a single process, that is the layers are not produced in separate processes and then later combined. In FIG. 1, the facer 12 includes a first layer 16 and a second layer 18. The first layer 16 is a non-woven glass fiber mat formed using coarse fibers 20. The term "coarse fibers" in this application is understood to mean glass fibers having an average diameter between about 8 and 25 µm and an average length between about ¼ inch and 2 inches. While the first layer 16 includes coarse fibers 20, the second layer 18 typically includes microfibers 22. The term "microfibers" is understood to mean glass fibers having an average diameter between about 0.5 and 6 µm with varying length. The coarse and microfibers may be fibers made from E glass, C glass, T glass, sodium borosilicate glass, A & S glasses, Basalt, mineral wool, slag fiber, and mixtures thereof.

In some embodiments, the second layer 18 may be formed solely out of microfibers 22. In another embodiment, the second layer 18 may be formed out of a combination of coarse fibers 20 and microfibers 22. When a combination of coarse fibers and microfibers are employed, the coarse fibers and microfibers are typically homogenously dispersed or distributed throughout the second layer 18. In an embodiment that includes both coarse fibers 20 and microfibers 22, the percentage of weight of the coarse fibers 20 and the microfibers 22 may vary. For example, the percentage by weight of the coarse fibers 20 in the second layer 18 may vary between 60 and 99 percent, while the percentage by weight of the microfibers 22 may vary between 1 and 40 percent. In another embodiment, the percentage by weight of the coarse fibers 20 in the second layer 18 may vary between 1 and 20 percent, while the percentage by weight of the microfibers 22 may vary between 80 and 99 percent, which would result in a mat that is substantially less porous. The coarse fibers 20 in the second layer 18 provide strength and integrity to the layer.

In another embodiment, the second layer 18 may be formed entirely of microfibers 22 having an average fiber diameter of between 0.5 and 6 µm. The second layer 18 may be formed from a single, relatively uniform, microfiber size or the second layer 18 may be formed from a combination of differently sized microfibers 22, which are typically homogenously dispersed or distributed throughout the second layer 18. For example, the second layer 18 may be formed from a first type of microfibers 22 having an average diameter between 0.5 and 1 µm, which is then mixed with a second type of microfibers 22 having an average diameter between 3 and 6 µm. The weight percentages of the first and second types of microfibers 22 may vary in the second layer 18. For example, the percentage by weight of the first type of microfiber 22 may vary between 5 and 50 percent while the second type of microfiber 22 may vary between 50 and 95 percent. The percentages of the first and second types of microfibers may be varied depending on an aesthetic attribute of the resulting layer 18. For example, if the layer 18 needs to be smooth, the layer 18 will contain a higher percentage of the first type of microfibers 22 having average diameters between 0.5 and 1 µm. If the purpose of the layer 18 is mainly to block the core material from passing through to the external surface, the layer 18 could include a blend of the first and second types of microfibers that is closure to a 50-50 blend.

In one embodiment, the first layer 16 may be formed entirely of coarse fibers 20 having an average fiber diameter of between 8 and 25 µm, between 8 and 16 µm, and more commonly between 11 and 16 µm. In another embodiment, the first layer 16 may include both coarse fibers 20 and microfibers 22, which are typically homogenously dispersed or distributed throughout the first layer 16. For example, the percentage by weight of the coarse fibers 20 in the first layer 16 may vary between 75 and 99 percent, while the percentage by weight of the microfibers 22 may vary between 1 and 25 percent. In another embodiment, the first layer 16 may be formed from a combination of differently sized coarse fibers 20, which are typically homogenously dispersed or distributed throughout the first layer 16. For example, the first layer 16 may be formed from a first type of coarse fibers 20 having an average diameter between 8 and 11 µm, which is then mixed with a second type of coarse fibers 20 having a diameter between 12 and 25 µm.

The facer 12 includes a binder that binds the respective fibers together in the first layer 16 and in the second layer 18 and that also bonds the first layer 16 and the second layer 18 together. In one embodiment, the facer 12 includes a single binder that functions to both bind the fibers together in the respective layers and bond the respective layers together. The binder is typically homogenously or relatively evenly dispersed or distributed throughout the facer 12. Stated differently, the binder may be distributed homogenously within the first layer 16 and the second layer 18 and may also be homogenously distributed through the first and second layers 16, 18. Since the binder is relatively evenly distributed through the facer 12 in this manner, the facer 12 does not include a separate binder, or a layer of binder, at an interface between the first layer 16 and the second layer 18. Stated differently, there is not a concentration of a binder at an interface or boundary between the first and second layers 16, 18 since the binder is evenly distributed through the facer 12. This even distribution of the binder results from the formation of the first and second layers 16, 18 in a single step. In addition, the fibers of the first and second layers 16, 18 are more integrated, intertwined, and intermeshed with one another at the interface or boundary of the layers due to the formation of the layers in a single step. This results in more gradual transition between the first and second layers 16, 18.

In some embodiments, the facer 12 may have a combined thickness 26 between about 0.1 and 1.5 mm. In some embodiments, the thickness of the facer 12 may be less than 20 percent of an overall thickness of the core 14. Although the facer 12 is illustrated on only a single side or face of the core 14, it should be realized that in other embodiments, the facer 12 may be positioned on both sides or faces of the core 14. In such instances, the first layer 16 is typically positioned directly adjacent the core 14 while the second layer 18 is positioned atop the first layer 16 as illustrated in FIG. 1.

As explained above, the facer 12 includes first and second layers 16, 18 with different densities. The differences in densities may facilitate coupling of the facer 12 to the core material 14 while also block the core material 14 from passing through (i.e., bleeding through) the facer 12. The first and second layers have respective thicknesses 30, 32. For example, the thickness 30 of the first layer 16 may be between 0.1 and 1 mm, and the thickness 32 of the second layer 18 may be between 0.1 and 0.5 mm. Each of these layers 16, 18 may also be defined as a percentage of the overall facer thickness 26. For example, the first layer 16 may be between 30 and 95 percent of the overall facer thickness 26, and the second layer 18 may be between 5 and 50 percent of the overall facer thickness 26. To prevent bleed through of the core material 14, the density of the second layer 18 may be proportional to the thickness of the second layer 18. For example, if the second layer 18 is more dense then the layer 18 may be thinner while still be effective to prevent bleed through. If the second layer 18 is too dense, however, the second layer 18 may not be open or porous enough to release moisture during curing, which might pose downstream issue during manufacturing of the board. The second layer 18 may be less dense when the layer 18 is a little thicker. The combination of the less dense and thicker board may still be effective to prevent bleed through. The combination of density and thickness described herein provides a good balance that is effective to prevent bleed through without causing manufacturing difficulties.

The thickness 30 of the first layer 16 may be greater than the thickness 32 of the second layer 18 because the first layer 16 may include more coarse fibers 20. Furthermore, because the first layer 16 includes coarse fibers 20 the density of the first layer 16 may be less than the second layer 18. The use of the coarse fibers 20 in the first layer 16 may render the first layer 16 more porous than the second layer 18. For example, the first layer 16 may have a Frasier air permeability of greater than or equal to 500 cubic feet per minute (cfm) when measured against a pressure drop of 0.5 in of water. The second layer 18 may have a Frasier air permeability of less than or equal to 300 cfm when measured according to the same standard. The less dense first layer 16 enables the first layer 16 to absorb the core material 14 when the facer 12 is applied as a facer to the core material 14 during manufacturing of the construction board 10. Specifically, the core material 14 may be relatively wet or unhardened and may absorb or penetrate into the first layer 16 due to the porosity of the first layer 16. The penetration or absorption of the core material 14 into the first layer 16 may bind the core material 14 to the facer 12 during manufacturing. However, because the second layer 18 includes microfibers 22 the second layer 18 is more dense than the first layer 16; the second layer 18 may therefore block the core material 14 from passing through the facer 12 when the facer 12 is applied as a facer to the core material 14 during manufacture of the construction board 10. The use of a significant amount of microfibers 22 in the second layer 18 renders the second layer 18 significantly less porous than the first layer 16, which blocks or prevents the core material 14 from bleeding through the second layer 18 to an exterior surface of the facer 12 where it would be visible. The inclusion of a significant amount of microfibers 22 in the second layer 18 allows the second layer 18 to exhibit a Frasier air permeability of less than or equal to 300 cfm. As illustrated, the core material 14 may absorb fully through the first layer 16 and partially through the second layer 18. The use of the microfibers 22, however, prevents bleed through of the core material 14 to the exterior surface of the facer 12. In this way, the facer 12 is able to form a uniform aesthetically pleasing appearance of the construction board 10 while absorbing the core material 14 to bond the facer to the core material 14.

Figure 2:
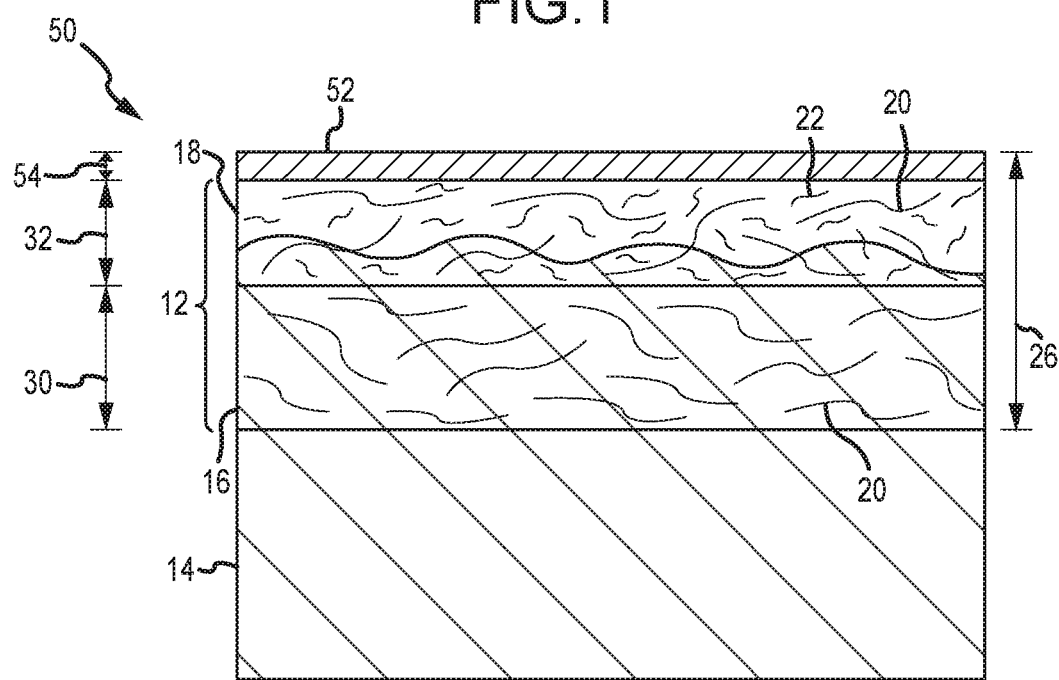
FIG. 2 is a cross-sectional view of a facer.

FIG. 2 is a cross-sectional view of a construction board 50. The construction board 50 includes a facer 12 coupled to a core material 14. The core material 14 may similarly be gypsum, magnesium oxide, polyisocyanurate, polystyrene, etc. As illustrated, the facer 12 includes multiple layers (e.g., 1, 2, 3, 4, 5, or more) formed in a single process. The facer 12 includes a first layer 16, a second layer 18, and a coating 52. The first layer 16 is a non-woven glass fiber mat formed using one or more types of coarse fibers. As explained above, the term "coarse fibers" in this application is understood to mean glass fibers having an average diameter between about 8 and 25 µm and an average length between about ¼ inch and 2 inches. The second layer 18 includes one or more types of microfibers and in some embodiments may include a combination of microfibers and coarse fibers. The term "microfibers" is understood to mean glass fibers having an average diameter between about 0.5 and 6 µm with varying length. The coarse and microfibers may be fibers made from E glass, C glass, T glass, sodium borosilicate glass, A & S glasses, Basalt, mineral wool, slag fiber, and mixtures thereof.

In some embodiments, the second layer 18 may be formed solely out of microfibers 22. In another embodiment, the second layer 18 may be formed out of a combination of coarse fibers 20 and microfibers 22, which are typically homogenously dispersed or distributed throughout the second layer 18. The percentage by weight of the coarse fibers 20 in the second layer 18 may vary between 60 and 99 percent, while the percentage by weight of the microfibers 22 may vary between 1 and 40 percent. In another embodiment, the percentage by weight of the coarse fibers 20 in the second layer 18 may vary between 1 and 20 percent, while the percentage by weight of the microfibers 22 may vary between 80 and 99 percent, which would result in a mat that is substantially less porous. The coarse fibers 20 in the second layer 18 provide strength and integrity to the layer.

In another embodiment, the second layer 18 may be formed from a combination of differently sized microfibers 22, which are typically homogenously dispersed or distributed throughout the second layer 18. For example, the second layer 18 may be formed from a first type of microfibers 22 having an average diameter between 0.5 and 1 µm, which is then mixed with a second type of microfibers 22 having an average diameter between 3 and 6 µm. The weight percentages of the first and second types of microfibers 22 may also vary in the second layer 18. For example, the percentage by weight of the first type of microfiber 22 may vary between 5 and 50 percent while the second type of microfiber 22 may vary between 50 and 95 percent. The percentages of the first and second types of microfibers may be varied depending on an aesthetic attribute of the resulting layer 18. For example, if the layer 18 needs to be smooth, the layer 18 will contain a higher percentage of the first type of microfibers 22 having average diameters between 0.5 and 1 µm. If the purpose of the layer 18 is mainly to block the core material from passing through to the external surface, the layer 18 could include a blend of the first and second types of microfibers that is closure to a 50-50 blend.

The first layer 16 may also include both coarse fibers 20 and microfibers 22, which are typically homogenously dispersed or distributed throughout the first layer 16. For example, the percentage by weight of the coarse fibers 20 in the first layer 16 may vary between 75 and 99 percent, while the percentage by weight of the microfibers 22 may vary between 1 and 25 percent. In another embodiment, the first layer 16 may be formed from a combination of differently sized coarse fibers 20, which are typically homogenously dispersed or distributed throughout the first layer 16. For example, the first layer 16 may be formed from a first type of coarse fibers 20 having average diameters between 8 and 11 µm, which is then mixed with a second type of coarse fibers 20 having average diameters between 12 and 25 µm. The weight percentages of the first and second types of coarse fibers 20 may also vary in the first layer 16. For example, the percentage by weight of the first type of coarse fibers may vary between 50 and 95 percent while the second type of coarse fibers may vary between 5 and 50 percent.

The facer 12 includes a binder that binds the respective fibers together in the first layer 16 and in the second layer 18 and that also bonds the first layer 16 and the second layer 18 together. In one embodiment, the facer 12 includes a single binder that functions to both bind the fibers together in the respective layers and bond the respective layers together. The binder is typically homogenously or relatively evenly dispersed or distributed throughout the facer 12. Stated differently, the binder may be distributed homogenously within the first layer 16 and the second layer 18 and may also be homogenously distributed through the first and second layers 16, 18. Since the binder is relatively evenly distributed through the facer 12 in this manner, the facer 12 does not include a separate binder, or a layer of binder, at an interface between the first layer 16 and the second layer 18. Stated differently, there is not a concentration of a binder at an interface or boundary between the first and second layers 16, 18 since the binder is evenly distributed through the facer 12. This even distribution of the binder results from the formation of the first and second layers 16, 18 in a single step. In addition, the fibers of the first and second layers 16, 18 are more integrated, intertwined, and intermeshed with one another at the interface or boundary of the layers due to the formation of the layers in a single step. This results in more gradual transition between the first and second layers 16, 18.

As explained above, the construction board 50 includes a facer 12 with the coating 52. The coating 52 is applied to the second layer 18 to supplement or add additional properties to the first and second non-woven glass layers 16 and 18. For example, the coating 52 may be a fire retardant coating, water repellent coating, washable coating, impact-resistant coating, scratch-resistant coating, soil resistant coating, or a combination thereof. In some embodiments, the coating 52 may be simply for aesthetic purposes. In some embodiments, the coating 52 may be a binder based material that is configured to remain atop the facer 12 rather than penetrate through the facer to bind the first and second layers, 16 and 18, together. The binder of the coating 52 may be a modified urea-formaldehyde binder that includes a filler, such as mica. The inclusion of the mica may enable the binder to remain atop the facer 12 and thereby form the coating 52. The binder may adhere the coating 52 to the top surface of the facer 12. The coating may include other materials as described herein, such as Aluminum Trihydrate (ATH), calcium carbonate, clay, vermiculite, wollastanite etc. or a combination of these.

In some embodiments, the facer 12 and coating 52 may have a combined thickness 26 between about 0.1 and 1.5 mm. In some embodiments, the thickness of the facer 12 may be less than 20 percent of an overall thickness of the core 14. Although the facer 12 is illustrated on only a single side or face of the core 14, it should be realized that in other embodiments, the facer 12 may be positioned on both sides or faces of the core 14. In such instances, the first layer 16 is typically positioned directly adjacent the core 14 while the second layer 18 is positioned atop the first layer 16 as illustrated in FIG. 2. A coating 52 may be applied atop the second layer 18.

As explained above, the facer 12 includes first and second layers 16, 18 with respective thickness 30, 32. The thickness 30 of the first layer 16 may be between 0.1 and 1 mm, and the thickness 32 of the second layer 18 may be between 0.1 and 0.5 mm. The coating 52 also defines a thickness 54, which is typically less than or equal to about 0.2 mm. Each of these layers 16, 18, and 52 may also be defined as a percentage of the overall facer thickness 26. For example, the first layer 16 may be between 30 and 95 percent of the overall facer thickness 26, the second layer 18 may be between 5 and 50 percent of the overall facer thickness 26, and the coating 52 may be less than 15 percent of the overall facer thickness 26. To prevent bleed through of the core material 14, the density of the second layer 18 may be proportional to the thickness of the second layer 18. For example, if the second layer 18 is more dense then the layer 18 may be thinner while still be effective to prevent bleed through. If the second layer 18 is too dense, however, the second layer 18 may not be open or porous enough to release moisture during curing, which might pose downstream issue during manufacturing of the board. The second layer 18 may be less dense when the layer 18 is a little thicker. The combination of the less dense and thicker board may still be effective to prevent bleed through. The combination of density and thickness described herein provides a good balance that is effective to prevent bleed through without causing manufacturing difficulties.

The thickness 30 of the first layer 16 may be greater than the thickness 32 of the second layer 18 because the first layer 16 may include more coarse fibers 20. Furthermore, because the first layer 16 includes coarse fibers 20 the density of the first layer 16 may be less than the second layer 18. The first layer 16 may be significantly more porous than the second layer 18. For example, the first layer 16 may have a Frasier air permeability of greater than or equal to 500 cubic feet per minute (cfm) when measured against a pressure drop of 0.5 in of water. The second layer 18 may have a Frasier air permeability of less than or equal to 300 cfm when measured according to the same standard. The less dense first layer 16 enables the first layer 16 to absorb and bind the core material 14 to the facer 12 during manufacturing. However, because the second layer 18 includes microfibers 22 the second layer 18 is more dense and less porous than the first layer 16; the second layer 18 is therefore able to block the core material 14 from passing through the facer 12. Similarly, the density of the second layer 18 may absorb but also block the coating 52 from passing through second layer 18. By blocking the flow of coating 52 through the second layer 18, the second layer 18 may reduce the use of coating 52 on the facer 12 while still forming a uniform and aesthetically appealing construction board 50. As illustrated, the core material 14 may absorb fully through the first layer 16 and partially through the second layer 18. The use of the microfibers 22, however, prevents bleed through of the core material 14 to the exterior surface of the facer 50. The inclusion of a significant amount of microfibers 22 in the second layer 18 allows the second layer 18 to exhibit an air permeability of less than or equal to 300 cfm.

Exemplary facers are described in the Table 1 below. In both examples, the top layer (i.e., second layer 18) includes a combination of coarse fiber (¾" K117 fibers) and microfiber (110X-481). The top layer includes approximately 90% coarse fibers and 10% microfibers. In both examples, the bottom layer (i.e., second layer 18) includes a combination of coarse fiber (¾" K117 fibers) and microfiber (110X-481). In the first example, the binder is a modified urea-formaldehyde (UF) binder. A filler material (i.e., mica) was added to the binder and the binder was added to the mat to bond the fibers of the two layers together. The binder was added so that the facer exhibited a loss on ignition of approximately 29%. The mica that was added to the binder formed a coating (i.e., coating 52) atop the facer. In addition to adhering the fibers together, the binder also adhered the filler particles (mica) together and adhered the coating layer to the facer.

Example 2 is similar to example 1 with the primary difference being the type of filler material that was employed. In example 2, the filler material is Aluminum Trihydrate (ATH). The filler material (ATH) formed a layer atop the facer due to the filler material being filter out by the second layer. In some instances, the air permeability may be controlled by the amount and type of filler particles that are added to the binder. The binder was added so that the facer exhibited a loss on ignition of approximately 27-28%. The properties of both facers were roughly the same with the exception of the air permeability, which was significantly less in the facer of example 1 due to the coating of the mica. The air permeability in example 1 was significantly less despite the facers having a roughly equivalent mean pore size.

application of a binder/adhesive at the interface of the two mats. The application of the adhesive at the interface results in a a concentration of binding material at the interface of the two layers and further results in two distinct layers—i.e., one layer containing the coarse fiber and microfiber and the other layer being solely coarse fiber.

TABLE 1

Exemplary facers

| Fiber | Binder | Basis Weight (lbs/ft$^2$) | LOI % | Glass WT (lbs/ft$^2$) | Glass & Filler WT (lbs/ft$^2$) | Filler WT (lbs/ft$^2$) | Air Perm (cfm) | Mean Pore Size (μm) |
|---|---|---|---|---|---|---|---|---|
| Example 1 | | | | | | | | |
| Top layer: 90% ¾" K117 & 10% 110X-481 Bottom Layer: 100% ¾" K117 | Arclin UF + Rhoplex GL-720 & Mica | 2.84 | 29.1 | 1.7 | 2.07 | 0.37 | 139 | 74 |
| Example 2 | | | | | | | | |
| Top Layer: 90% ¾" K117 & 10% 110x-481 Bottom Layer: 100% ¾" K117 | Arclin UF + Rhoplex GL 720 & ATH | 3.0 | 27.5 | 1.66 | 2.15 | 0.49 | 272 | 74 |

Table 2 below provides additional exemplary mats or facers in comparison with conventional facers that are used for construction boards. The first conventional mat (i.e., labeled "Mat 1" in Table 2) is a combination of ¾ inch Johns Manville K117 glass fibers and Johns Manville 110X-481 microglass fibers. The porosity of Mat 1 is in the mid-range, which may be attributed to the addition of microfiber. Table 3 demonstrates that Mat 1 has a high propensity to absorb water (i.e., 292% absorption), which might not be desirable for certain applications. The absorption percentage indicated in Table 3 is the weight of water absorbed by the glass mat as a percentage of the mat weight. It may be possible to reduce the water absorption by adding a coating layer to Mat 1, however, for certain applications the addition of a coating may render Mat 1 too closed off (indicated by low air perm of 280) to allow the core material to penetrate into the mat, which would result in a weak bond between the core material and Mat 1.

The other conventional mat (i.e., labeled "Mat 2" in Table 2) is modified to alleviate some of the issues associated with bonding the facer to the core. However, Mat 2 is too open or porous as demonstrated by the high air permeability and thus, Mat 2 suffers from the core material bleeding through the mat to the exterior surface of the facer. A coating layer typically cannot be applied to Mat 2 as described herein due in part to the high air permeability since the high porosity of the mat will allow the coating to penetrate into and throughout the mat, which will close off the pores. The closed pores prevent the core material from penetrating into the mat, which would result in a weak bond between the core material and the facer. For such a mat, a coating layer has to be applied as a secondary and separate step, which is a time consuming, complicated, and costly process.

In some instances, conventional Mat 1 can be combined with conventional Mat 2 to form a dual layer. However, this combination has to be performed in a second step by Example 1 in Table 2 is a dual layer structure where top layer consists of ¾ inch Johns Manville K117 glass fiber and Johns Manville 110X-481 glass microfiber. The bottom layer is 100 percent ¾ inch Johns Manville K117 glass fibers. Both layers are formed simultaneously as described herein and thus, the resulting mat is free of a concentrated adhesive layer between the two layers. The binder is modified UF, which binds the fibers and the two layers together. Mica was added to the binder which forms a top coating layer. The bottom layer is open and has an air permeability similar to Mat 2 (i.e., 617 cfm), which allows the core material to penetrate into the bottom layer and form a good bond. The top layer has an air permeability similar to Mat 1 (i.e., 280), which prevents bleed through of the core material. The mica coating on top can provide additional smoothness to the facer for handling, for reducing water absorption, for reducing air permeability and/or porosity, etc. Example 1 may have a total air permeability of about 139 cfm.

Example 2 in Table 2 is constructed similar to that of Example 1, except that ATH was added to the binder instead of Mica. Example 2 demonstrates that different raw materials can be used as a coating layer. Table 3 shows a comparison of the mat produced in Example 2 and Mat 1 and specifically shows a significant reduction in water absorption that is achieved via the mat of Example 2—i.e., 3.70 percent in comparison with 292 percent for Mat 1.

Example 3 in Table 2 is constructed similar to that of Examples 1 and 2. The binder used in Example 3 is an acrylic binder modified with UF, which demonstrates that various examples of binders can be used to construct the multi-layered mats described herein. No filler was added to the binder used in constructing the mat of Example 3. The single binder is the only component that is used to bond or adhere the fibers in the two layers and to bond or adhere the two layers together.

In all three examples, the binder is uniformly or homogenously distributed throughout the top and bottom layers and there is no binder concentration at the interface. In addition, because the two layers were formed simultaneously, a small gradient of microfibers exists at the interface, which enhances the physical bond or entanglement of the fibers of the top and bottom layers. Specifically, a portion of the microfibers of the second layer 18 at or near the interface migrate into the first layer 16 and vice versa. The degree of migration of the fibers and the resulting physical bond or entanglement is unique to the mats formed in accordance with the disclosure herein since such entanglement and migration is not achievable without simultaneously forming the layers. The migration of the fibers is a desirable feature since it makes the interface between the layers gradual, which allows the core material to partially penetrate into the second layer 18. The migration of the fibers also forms a strong bond between the layers.

formed and then combined at a later stage or process (i.e., separately made and then bonded together). The facers 12 produced by the manufacturing system 68 may therefore be produced at lower cost and in less time.

The manufacturing system 68 includes multiple fluid lines that deliver coarse fibers and microfibers to a hydroformer 70 that simultaneously forms the first and second layers 16, 18 of the facer 12. While a hydroformer 70 is illustrated, a fourdinier wire or a delta former may also be used to produce first and second layers 16, 18 of the facer 12 in a single step/process.

The manufacturing system 68 produces the first layer 16 using a first fluid line 72 that delivers coarse fiber to the hydroformer. The first fluid line 72 includes at least one coarse fiber source 74 containing one or more types of coarse fibers (e.g., differently sized coarse fibers, coarse

TABLE 2

Exemplary facers in comparison with conventional facers

| Fiber | Binder | Basis Weight (lbs/ft$^2$) | LOI % | Glass WT (lbs/ft$^2$) | Glass & Filler WT (lbs/ft$^2$) | Filler WT (lbs/ft$^2$) | Overall Air Perm (cfm) |
|---|---|---|---|---|---|---|---|
| Example 1 | | | | | | | |
| Top layer: 90% ¾" K117 & 10% 110X-481 Bottom Layer: 100% ¾" K117 | Arclin UF + Dow Acrylic & Mica | 2.85 | 29.1 | 1.7 | 2.07 | 0.37 | 139 |
| Example 2 | | | | | | | |
| Top layer: 90% ¾" K117 & 10% 110X-481 Bottom Layer: 100% ¾" K117 | Arclin UF + Dow Acrylic & ATH | 3.00 | 27.5 | 1.66 | 2.15 | 0.49 | 272 |
| Example 3 | | | | | | | |
| Top Layer: 90% ¾"K117 & 10% 110X-481 Bottom Layer: 100% ¾" K117 | Lubrizol Styrene Acylic + Arclin UF | 2.40 | 28.5 | 1.72 | 1.72 | 0 | 110 |
| Mat 1 typically used as facer | | | | | | | |
| 90% ¾" K117 & 10% 110x-481 | Arclin UF + Dow Acrylic | 2.25 | 27.0 | 1.64 | 1.64 | 0 | 280 |
| Mat 2 typically used as facer | | | | | | | |
| ¾" K 117 | Arclin UF + Dow Acrylic | 2.10 | 20.0 | 1.68 | 1.68 | 0 | 617 |

Table 3 shows a comparison between conventional Mat 1 and the mat of Example 2 in Table 2 above.

TABLE 3

Comparison of conventional Mat 1 and Example mat 2 of Table 2

| | Fiber | Binder | Absorption |
|---|---|---|---|
| Mat 1 | 90% ¾" K117 & 10% 110x-481 | Arclin UF + Dow Acrylic | 292% |
| Example 2 | Top layer: 90% ¾" K117 & 10% 110X-481 Bottom Layer: 100% ¾" K117 | Arclin UF + Dow Acrylic & ATH | 3.70% |

Fiber Mat Forming System

Figure 3:
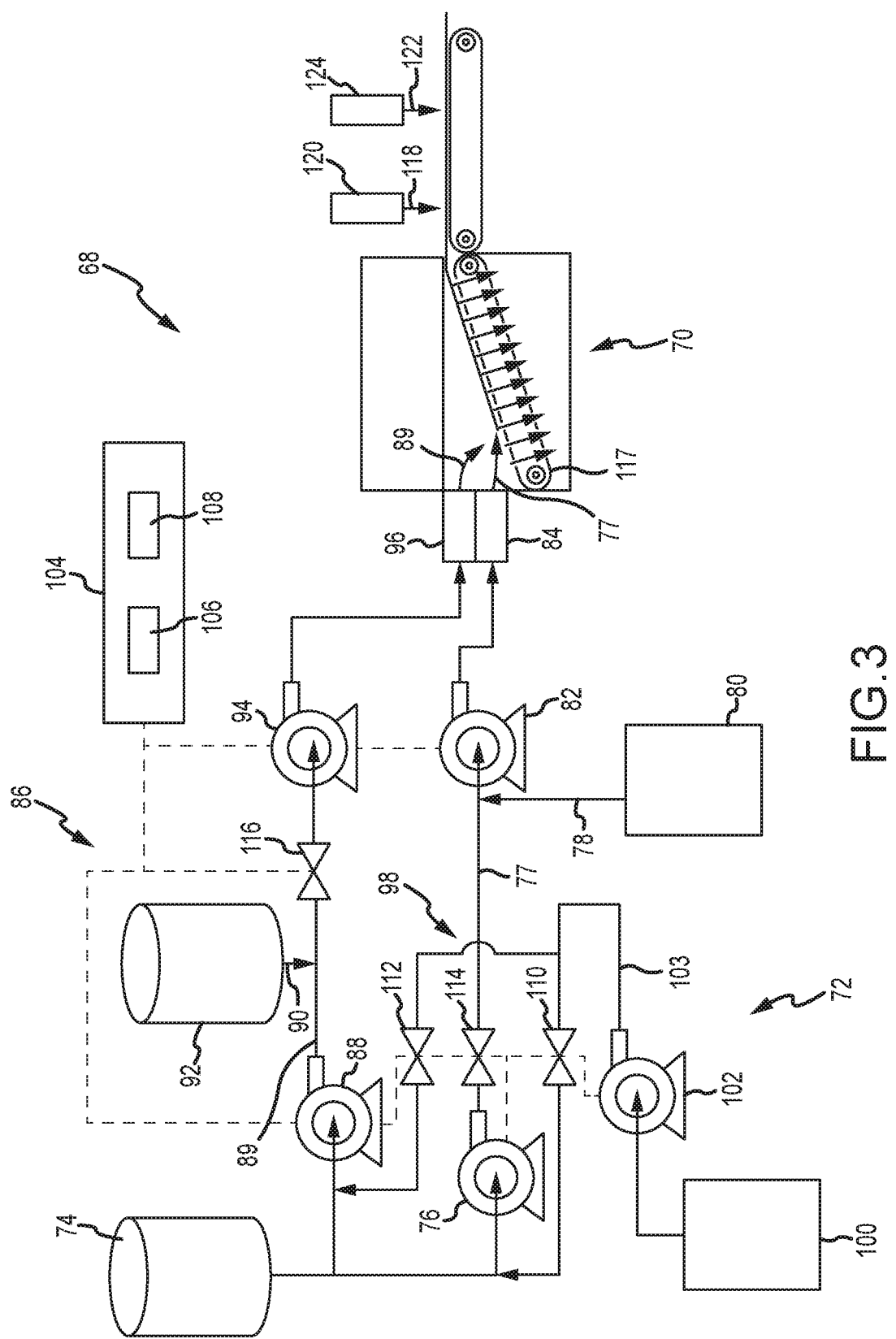
FIG. 3 is a schematic view of a manufacturing system that produces a facer.

FIG. 3 is a schematic view of a manufacturing system 68 that produces a facer 12. In operation, the manufacturing system 68 is able to produce a multilayered facer in a single step/process. That is the layers of the facer are not separately fibers made from different materials, or a combination thereof). Fluidly coupled to the coarse fiber source 74 is a pump 76 (e.g., a thick stock pump) that pumps a first fluid 77 containing the coarse fibers. For example, the first fluid 77 may include water, viscosity modifiers, dispersants, defoamers, etc. mixed with the coarse fibers. After passing through the pump 76, the first fluid 77 is diluted with a dilution fluid 78 (e.g., water, viscosity modifiers, dispersants, defoamers, or a combination thereof) stored in a dilution tank 80. By diluting the coarse fibers, the manufacturing system 68 may enable a more even distribution of the coarse fibers in the first layer 16 by the hydroformer. The dilution fluid 80 combines with the first fluid 77 before the first fluid 77 enters a second pump 82. The pump 82 (e.g., thin stock pump) may facilitate mixing of the first fluid 77 and the dilution fluid 80 before delivery to the hydroformer 70. After exiting the pump 82, the first fluid 77 enters a first inlet pipe 84 of the hydroformer 70. The first inlet pipe 84 directs the first fluid 77 into the hydroformer 70, which forms the first layer of the facer 12 by removing the first fluid 77 and dilution fluid 80 from the fluid/coarse fiber mixture as the mixture is poured onto the hydroformer 70.

In order to form the second layer 18 of the facer 12, the manufacturing system 68 includes a second fluid line 86. The second fluid line 86 includes at least one coarse fiber source 74 containing one or more types of coarse fibers (e.g., differently sized coarse fibers, coarse fibers made from different materials, or a combination thereof). Fluidly coupled to the coarse fiber source 74 is a pump 88 (e.g., a thick stock pump) that pumps a second fluid 89 containing the coarse fibers. For example, the second fluid 89 may include water, viscosity modifiers, dispersants, defoamers, etc. mixed with the coarse fibers. After passing through the pump 88, the second fluid 89 is diluted with a dilution fluid 90 (e.g., water, viscosity modifiers, dispersants, defoamers, or a combination thereof) stored in a dilution tank 92. By diluting the second fluid 89, the manufacturing system 68 may enable even distribution of the fibers in the second layer 18. The dilution fluid 90 combines with the second fluid 89 before the second fluid 89 enters a second pump 94. The pump 94 (e.g., thin stock pump) enables mixing of the second fluid 89 and the dilution fluid 90 before delivery to the hydroformer 70. After exiting the pump 94, the second fluid 89 enters a second inlet pipe 96 of the hydroformer 70. The second inlet pipe 96 directs the second fluid 89 into the hydroformer 70, which forms the second layer 18 of the facer 12 by removing the second fluid 89 and dilution fluid 90 from the fluid/fiber mixture as the mixture is poured onto the hydroformer 70 atop the first layer of the facer 12 that was immediately formed by the hydroformer. The second fluid 89 is directed or poured atop the first layer of the facer 12 as the fluid is being drained from the first fluid 77 such that the second layer 18 and the first layer 16 are formed simultaneously by the hydroformer.

Fluidly coupled to both the first and second fluid lines 72, 86 is a third fluid line 98. The third fluid line 98 includes at least one microfiber source 100 containing one or more types of microfibers (e.g., differently sized microfibers, microfibers made from different materials, or a combination thereof). Fluidly coupled to the microfiber source 100 is a pump 102 (e.g., a stock pump) that pumps a third fluid 103 containing the microfibers. The third fluid 103 may include water, viscosity modifiers, dispersants, defoamers, etc. mixed with the microfibers. After passing through the pump 102, the third fluid 103 may be pumped into the first and/or second fluid lines 72, 86. In this way, microfibers may be mixed with coarse fibers to increase the density of either the first and/or second layers 16, 18. As illustrated, the third fluid line 98 couples upstream from the pumps 76 and 88. By coupling upstream from the pumps 76 and 88, the manufacturing system 68 uses the turbulent flow through the pumps 76 and 88 to facilitate mixing of the third fluid 103 with the first and/or second fluids 77, 89. However, in some embodiments, the third fluid line 98 may couple to the first and second fluid lines 72, 86 downstream from the pumps 76 and 88. For example, the manufacturing system 68 may rely on the pumps 82 and 94 to mix the third fluid 103 with the first or second fluids 77, 89. In still other embodiments, the third fluid line 98 may couple upstream as well as downstream of the pumps 76 and 88. This layout may enable the gradual introduction of the third fluid into the first and/or second fluid lines at different locations.

The flow of the first, second, and third fluids 77, 89, 103 through the manufacturing system 68 may be controlled with a controller 104. The controller 104 may include one or more processors 106 that execute instructions stored on one or more memories 108 to control the operation of various valves as well as the pumps. For example, the third fluid line 98 may include first and second valves 110, 112. As illustrated, the first valve 110 controls the flow of the third fluid into the first fluid line 72, while the second valve 112 controls the flow of the third fluid into the second fluid line 86. By controlling the first and second valves 110, 112 the controller 104 is able to control the amount of the third fluid combining with the first and/or second fluids 77, 89. This in turn controls the amount of microfibers in the first and second layers 16, 18 produced in the hydroformer 70. In this way, the manufacturing system 68 may vary the microfiber content in the first and second layers 16, 18 to between 0 and 100 percent, and more commonly to the percentages described in the facer embodiments herein.

The manufacturing system 68 may also control the fluid flow through the first and second fluid lines 72, 86 using additional valves 114 and 116 as well as controlling the pumps 76, 82, 88, 94, and 102. By controlling the flow of the first and second fluids 77, 89 the controller 104 may increase or decrease thickness of the respective first and second layers 16, 18. Stated differently, the manufacturing system 68 may increase or decrease the thickness of the first and/or second layers 16, 18 of the facer 12 depending on the type of desired facer 12. For example, the manufacturing system 68 may increase the flow of the first fluid 77 through the fluid line 72 to increase the thickness of the first layer 16 and decrease the flow of the second fluid 89 to decrease the thickness of the second layer 18. Similarly, the manufacturing system 68 may decrease the flow of the first fluid 77 through the fluid line 72 to decrease the thickness of the first layer 16 and increase the flow of the second fluid 89 to increase the thickness of the second layer 18.

As the first and second fluids 77, 89 enter the hydroformer 70 they contact a conveyer belt 117 that drains a substantially majority of the fluid in the first and second fluids 77, 89 leaving behind the combined first and second layers 16, 18. The manufacturing system 68 may then apply one or more binders 118. In some embodiments, the binder 118 may include additives, such as flame resistant resinous binders such as urea formaldehyde, modified urea formaldehyde, acrylic resins, modified acrylic resins, polyurethanes, polyvinyl chlorides, melamine resins, homopolymers or copolymers of polyacrylic acid; crosslinking acrylic copolymers; crosslinked vinyl chloride acrylate copolymers (e.g., copolymers having a GTT of about 113° C. or less), among other types of binders. Flame retardants may also be included in the binder, such as Alumina trihydrate, organic phosphonates, Antimony oxide, and the like.

These binders 118 may be stored in one or more binder sources 120. The binder(s) 118 may be applied to the first and second layers 16, 18 by moving the first and second layers 16, 18 under a spray or waterfall of binder. Any excess binder may then flow through the first and second layers. In this way, the manufacturing system 68 may bind the fibers in their respective layers as well as bind the layers 16, 18 together without performing multiple binding steps/processes. Stated differently, the manufacturing system 68 may simultaneously bind the fibers in the respective layers and bond the fibers layers together in a single step. The application of the binder(s) 118 to the first and second layers 16, 18 simultaneously results in the binder being relatively evenly distributed through and between the first and second layers 16, 18 without forming or defining a binder layer between the first and second layers 16, 18. Stated differently, a separate or individual layer of binder is not formed or defined at an interface or boundary between the first and second layers 16, 18 as occurs in conventional systems where the layers are formed individually and combined in a subsequent process. The relatively even distribution of the binder(s) 118 may increase the strength of the facer and/or reduce issues such as delamination of the layers. In addition, the facer described herein has a less defined boundary between the first and second layers 16, 18 since these layers are simultaneously formed. Rather, the facer has a relatively gradual transition from the first layer 16 to the second layer 18 due to the simultaneous formation of the layers, which may increase the strength and/or reduce issues such as delamination of the layers.

In some embodiments, the manufacturing system 68 may deposit a coating(s) 122 atop the second layer 18 after applying the binder 118. The coating 122 may be stored in a coating source 124 (e.g., tank) and sprayed onto the facer 12. In other embodiments, the coating may be formed via a filler material that is added to the binder and that is filtered out via the second layer 18. For example, the filler material (e.g., mica) may be added to the binder and the binder may be applied to the facer 12 to bind the fibers together. Excess binder 118 may be removed from the facer 12 via an applied vacuum or via some other method. The second layer 18, and in particular the microfibers, may act as a filter for the filler material (e.g., mica) during the binder application process. The filler material that is deposited on and remains atop the second layer 18 forms a coating layer 122. The binder 118 adheres the filler particle to the second layer 18, thereby adhereing the coating 122 to the second layer 18. In this embodiment, a second or additional step of applying the coating 122 separately is not needed. The coating 122 may be a fire retardant coating, water repellent coating, washable coating, impact-resistant coating, scratch-resistant coating, soil resistant coating, or a combination thereof.

Figure 4:
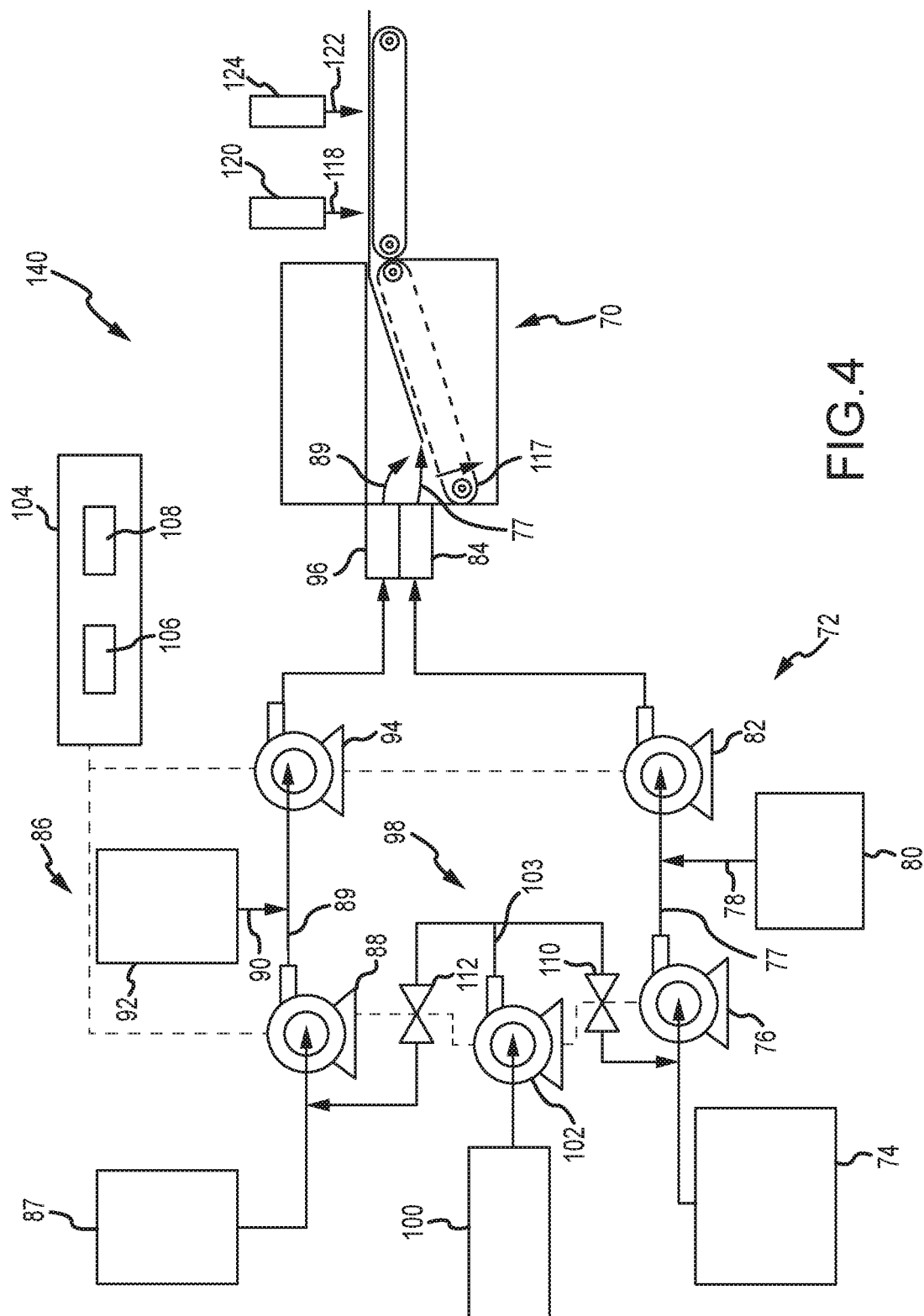
FIG. 4 is a schematic view of a manufacturing system that produces a facer.

FIG. 4 is a schematic view of a manufacturing system 140 that produces a facer 12. In operation, the manufacturing system 140 is able to produce a multilayered facer in a single step/process. That is the layers 16, 18 of the facer 12 are not separately formed and then combined at a later stage or process (i.e., separately made and then bonded together). The facers 12 produced by the manufacturing system 140 may therefore be produced at lower cost and in less time.

The manufacturing system 140 includes multiple fluid lines that deliver coarse fibers and microfibers to a hydroformer 70 that simultaneously forms the first and second layers 16, 18 of the facer 12. While a hydroformer 70 is illustrated, a fourdinier wire or delta former may also be used to produce first and second layers 16, 18 of the facer 12 in a single step/process.

The manufacturing system 140 produces the first layer 16 using a first fluid line 72 that delivers coarse fiber to the hydroformer. The first fluid line 72 includes at least one coarse fiber source 74 containing one or more types of coarse fibers (e.g., differently sized coarse fibers, coarse fibers made from different materials, or a combination thereof). Fluidly coupled to the coarse fiber source 74 is a pump 76 (e.g., a thick stock pump) that pumps a first fluid 77 containing the coarse fibers. For example, the first fluid 77 may include water, viscosity modifiers, dispersants, defoamers, etc. mixed with the coarse fibers. After passing through the pump 76, the first fluid 77 is diluted with a dilution fluid 78 (e.g., water, viscosity modifiers, dispersants, defoamers, or a combination thereof) stored in a dilution tank 80. By diluting the coarse fibers, the manufacturing system 140 may enable even distribution of the coarse fibers in the first layer 16 by the hydroformer 70. The dilution fluid 80 combines with the first fluid 77 before the first fluid 77 enters a second pump 82. The pump 82 (e.g., thin stock pump) may facilitate mixing of the first fluid 77 and the dilution fluid 80 before delivery to the hydroformer 70. After exiting the pump 82, the first fluid 77 enters a first inlet pipe 84 of the hydroformer 70. The first inlet pipe 84 directs the first fluid 77 into the hydroformer 70, which forms the first layer of the facer 12 by removing the first fluid 77 and dilution fluid 80 from the fluid/fiber mixture as the mixture is poured onto the hydroformer 70.

In order to form the second layer 18 of the facer 12, the manufacturing system 140 includes a second fluid line 86. The second fluid line 86 includes at least one coarse fiber source 87 containing one or more types of coarse fibers (e.g., differently sized coarse fibers, coarse fibers made from different materials, or a combination thereof). The coarse fibers in the coarse fiber source 87 may be the same as or different from the coarse fibers in the coarse fiber source 74. In this way, the first and second fluid lines 72 and 86 may produce layers with different coarse fibers sizes and/or coarse fibers made from different materials. Fluidly coupled to the coarse fiber source 74 is a pump 88 (e.g., a thick stock pump) that pumps a second fluid 89 containing the coarse fibers. For example, the second fluid 89 may include water, viscosity modifiers, dispersants, defoamers, etc. mixed with the coarse fibers. After passing through the pump 88, the second fluid 89 is diluted with a dilution fluid 90 (e.g., water, viscosity modifiers, dispersants, defoamers, or a combination thereof) stored in a dilution tank 92. By diluting the second fluid 89, the manufacturing system 140 may enable even distribution of the fibers in the second layer 18. The dilution fluid 90 combines with the second fluid 89 before the second fluid 89 enters a second pump 94. The pump 94 (e.g., thin stock pump) enables mixing of the second fluid 89 and the dilution fluid 90 before delivery to the hydroformer 70. After exiting the pump 94, the second fluid 89 enters a second inlet pipe 96 of the hydroformer 70. The second inlet pipe 96 directs the second fluid 89 into the hydroformer 70, which forms the second layer 18 of the facer 12 by removing the second fluid 89 and dilution fluid 90 from the fluid/fiber mixture as the mixture is poured onto the hydroformer 70 atop the first layer of the facer 12 that was immediately formed by the hydroformer. The second fluid 89 is directed or poured atop the first layer 16 of the facer 12 as the fluid is being drained from the first fluid 77 such that the second layer 18 and the first layer 16 are formed simultaneously by the hydroformer.

Fluidly coupled to both the first and second fluid lines is a third fluid line 98. The third fluid line 98 includes at least one microfiber source 100 containing one or more types of microfibers (e.g., differently sized microfibers, microfibers made from different materials, or a combination thereof). Fluidly coupled to the microfiber source 100 is a pump 102 (e.g., a stock pump) that pumps a third fluid 103 containing the microfibers. The third fluid 103 may include water, viscosity modifiers, dispersants, defoamers, etc. mixed with the microfibers. After passing through the pump 102, the third fluid 103 may be pumped into the first and/or second fluid lines 72, 86. In this way, microfibers may be mixed with coarse fibers to increase the density of either the first and/or second layers 16, 18. As illustrated, the third fluid line 98 couples upstream from the pumps 76 and 88. By coupling upstream from the pumps 76 and 88, the manufacturing system 140 uses the turbulent flow through the pumps 76 and 88 to facilitate mixing of the third fluid 103 with first and/or second fluids 77, 89. However, in some embodiments, the third fluid line 98 may couple to the first and second fluid lines 72, 86 downstream from the pumps 76 and 88. For example, the manufacturing system 68 may rely on the pumps 82 and 94 to mix the third fluid 103 with the first or second fluids 77, 89. In still other embodiments, the third fluid line 98 may couple upstream as well as downstream of the pumps 76 and 88. This layout may enable the gradual introduction of the third fluid into the first and/or second fluid lines at different locations.

The flow of the first, second, and third fluids 77, 89, 103 through the manufacturing system 140 may be controlled with a controller 104. The controller 104 may include one or more processors 106 that execute instructions stored on one or more memories 108 to control the operation of the valves as well as the pumps. For example, the third fluid line 98 may include first and second valves 110, 112. As illustrated, the first valve 110 controls the flow of the third fluid into the first fluid line 72, while the second valve 112 controls the flow of the third fluid into the second fluid line 86. By controlling the first and second valves 110, 112, the controller 104 is able to control the amount of the third fluid combining with the first and/or second fluids 77, 89. This in turn controls the amount of microfibers in the first and second layers 16, 18. Accordingly, the first and second layers 16, 18 may vary in microfiber content including having no microfiber content.

The manufacturing system 140 may also control the fluid flow through the first and second fluid lines 72, 86 by controlling the pumps 76, 82, 88, 94, and 102. By controlling the flow of the first and second fluids 77, 89 the controller 104 may increase or decrease thickness of the respective first and second layers 16, 18. That is the manufacturing system 140 may increase or decrease the thickness of the first and/or second layers 16, 18 of the facer 12 depending on the desired facer 12. For example, a specific application may call for a thicker facer 12 to absorb more core material during manufacturing of the construction board 10.

As the first and second fluids 77, 89 enter the hydroformer 70 they contact a conveyer belt 117 that drains a substantially majority of the first and second fluids 77, 79 leaving behind the combined first and second layers 16, 18. The manufacturing system 140 may then apply one or more binders 118. In some embodiments, the binder 118 may include additives, such as flame resistant resinous binders such as urea formaldehyde, modified urea formaldehyde, acrylic resins, modified acrylic resins, polyurethanes, polyvinyl chlorides, melamine resins, homopolymers or copolymers of polyacrylic acid; crosslinking acrylic copolymers (e.g., acrylic copolymers having a glass transition temperature (GTT) of at least about 25° C.); crosslinked vinyl chloride acrylate copolymers (e.g., copolymers having a GTT of about 113° C. or less), among other types of binders. Flame retardants may also be included in the binder, such as Alumina trihydrate, organic phosphonates, Antimony oxide, and the like.

These binders 118 may be stored in one or more binder sources 120. The binder(s) 118 may be applied to the first and second layers 16, 18 by moving the first and second layers 16, 18 under a spray or waterfall of binder. Any excess binder 118 may then flow through the first and second layers. In this way, the manufacturing system 140 may bind the fibers in their respective layers as well as bond the layers 16, 18 together without performing multiple binding steps/processes. Stated differently, the manufacturing system 140 may simultaneously bind the fibers in the respective layers and bond the fibers layers together in a single step. The application of the binder(s) 118 to the first and second layers 16, 18 simultaneously results in the binder being relatively evenly distributed through and between the first and second layers 16, 18 without forming or defining a binder layer between the first and second layers 16, 18. Stated differently, a separate or individual layer of binder is not formed or defined at an interface or boundary between the first and second layers 16, 18 as occurs in conventional systems where the layers are formed individually and combined in a subsequent process. The relatively even distribution of the binder(s) 118 may increase the strength of the facer and/or reduce issues such as delamination of the layers. In addition, the facer has a less defined boundary between the first and second layers 16, 18 since these layers are simultaneously formed. Rather, the facer has a relatively gradual transition from the first layer 16 to the second layer 18 due to the simultaneous formation of the layers, which may increase the strength and/or reduce issues such as delamination of the layers.

After applying the binder 118, the manufacturing system 140 may deposit a coating(s) 122 on the second layer 18. The coating 122 may be stored in a coating source 124 (e.g., tank) and sprayed onto the facer 12. In other embodiments, the coating may be formed via a filler material that is added to the binder and that is filtered out via the second layer 18. For example, the filler material (e.g., mica) may be added to the binder and the binder may be applied to the facer 12 to bind the fibers together. Excess binder 118 may be removed from the facer 12 via an applied vacuum or via some other method. The second layer 18, and in particular the microfibers, may act as a filter for the filler material (e.g., mica) during the binder application process. The filler material that is deposited on and remains atop the second layer 18 forms a coating layer 122. The binder 118 adheres the filler particle to the second layer 18, thereby adhereing the coating 122 to the second layer 18. In this embodiment, a second or additional step of applying the coating 122 separately is not needed. The coating 122 may be a fire retardant coating, water repellent coating, washable coating, impact-resistant coating, scratch-resistant coating, soil resistant coating, or a combination thereof.

For convenience in describing the various embodiments herein, the fibers were referred to a glass fibers—i.e., coarse glass fibers, microfibers, and the like. It should be realized that various other fiber types may be used in any of the embodiments described herein and that the embodiments are not limited solely to glass fibers unless otherwise specified in the claims. It should also be realized that the use of non-glass fibers are contemplated as being used in any of the embodiments. The non-glass fibers may be used in combination with glass fibers or instead of glass fibers. Accordingly, unless otherwise explicitly specified in the claims, the concepts and embodiments described herein may include only glass fibers, only non-glass fibers, or any combination of glass and non-glass fibers. Exemplary non-glass fibers include polymer fibers, synthetic fibers, organic fibers, inorganic fibers, natural fibers, and the like. Similarly, it should be understood that the glass microfibers and/or glass coarse fibers described herein can be partially or completely replaced with polymeric, synthetic, or natural microfibers. Thus, the general term "fibers", "coarse fibers", and/or "microfibers" may be used in the claims with such usage being understood to cover a variety of fibers including glass fibers and non-glass fibers. The terms "coarse fibers" and "microfibers" will be understood in relation to size to have the definitions provided herein.

Exemplary Methods

Figure 5:
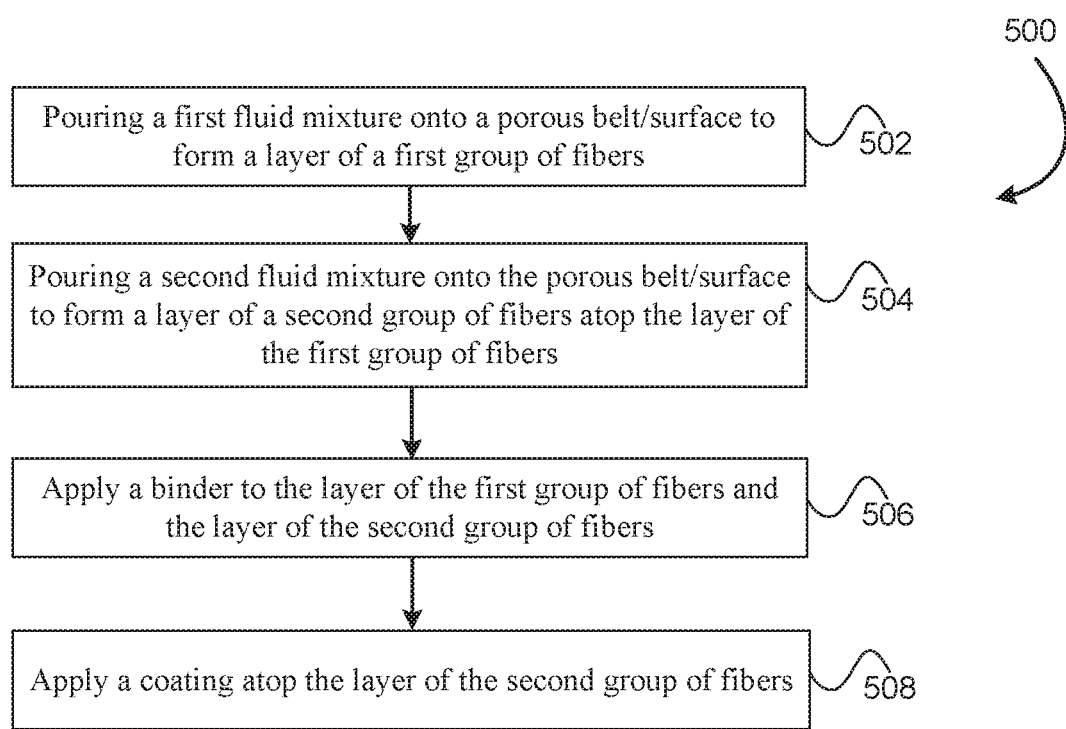
FIG. 5 is a method of forming a multi-layer fiber mat.

Referring now to FIG. 5, illustrated is a method 500 of forming a fiber mat. In a specific embodiment, the fiber mat may be a glass facer for a construction board. At block 502, a first fluid mixture is poured or applied onto a porous belt or surface. The first fluid mixture includes a first group of fibers that are homogenously mixed or dispersed within a first fluid. In a specific embodiment, the first group of fibers comprise or consist of coarse glass fibers having an average fiber diameter of between 8 µm and 25 µm. In other embodiments, the first group of fibers comprise or consist of a combination of coarse fibers and microfibers as described herein. When the first fluid mixture is applied or poured atop the porous belt or surface, the first fluid is drained or removed from the first fluid mixture so that a layer of the first group of fibers is formed atop the porous belt or surface. In some embodiments a vacuum may be applied to the porous belt or surface to facilitate in removal of the first fluid from the first fluid mixture.

At block 504, a second fluid mixture is poured or applied onto the porous belt or surface atop the layer of the first group of fibers. The second fluid mixture includes a second group of fibers that are homogenously mixed or dispersed within a second fluid. In a specific embodiment, the second group of fibers comprise or consist of a combination of coarse glass fibers having an average fiber diameter of between 8 µm and 25 µm and glass microfibers having an average fiber diameter of between 0.5 µm and 6 µm. The amount of each fiber type may be similar to the embodiments described herein. In another embodiment, the second group of fibers comprises or consists entirely of glass microfibers having an average fiber diameter of between 0.5 µm and 6 µm.

When the second fluid mixture is applied or poured atop the porous belt or surface, the second fluid is drained or removed from the second fluid mixture so that a layer of the second group of fibers is formed atop the porous belt or surface and atop the layer of the first group of fibers. The second fluid mixture is poured or applied onto the porous belt or surface as the first fluid is being removed from the first fluid mixture. As such, the layer of the first group of fibers is typically not fully formed or defined until after the second fluid mixture is poured or applied onto the porous belt or surface. In this manner, the layer of the first group of fibers and the layer of the second group of fibers are formed simultaneously atop the porous belt or surface. The second fluid mixture may be poured directly vertically above the first fluid layer and thus, both layers may be poured simultaneously atop each other. Stated differently, since the layer of the first group of fibers is not fully formed or defined until after the second fluid mixture is poured or applied onto the porous belt or surface, the layer of the first group of fibers is formed or defined at essentially the same time as the layer of the second group of fibers is formed or defined atop of the porous belt or surface. Since the layer of the first group of fibers and the layer of the second group of fibers are formed simultaneously, the degree of intermeshing or entangling of the fibers at the interface of the two layers is significantly greater than in conventional fiber mats where one or both of the layers are fully formed or defined prior to application of the other layer. In some embodiments, the second fluid mixture may be poured or applied onto the porous belt or surface within 30 inches of where the first fluid mixture is poured or applied onto the porous belt or surface. In such instances, the fiber mat forming section (i.e., porous belt) may be extremely long such that the first layer is still dewatering when the second fluid mixture is applied to the belt. In other instances, the second layer may be poured within 12 inches or within 6 inches after the first layer is poured or applied to the porous belt. In such instances, the first layer may be partially dewatered, but still in the process of forming on the porous belt. In some embodiments, the second layer 18 (e.g., a more dense layer) may be poured atop the porous belt first and then the first layer 16 (e.g., a less dense layer) may be poured atop the second layer 18. In such instances, a more dense layer may be formed on the bottom while a less dense layer is simultaneously formed on the top.

At block 506, a binder is simultaneously applied to the layer of the first group of fibers and the layer of the second group of fibers in order to bind the two layers together and to bind the various fibers within each layer together. In most embodiments, a binder is not applied to either layer prior to block 506, or stated differently, the layers are typically free of a binder prior to block 506. The simultaneous application of the binder to the two layers, which are typically free of a binder prior to block 506, results in a more homogenous or uniform distribution of the binder throughout the fiber mat. In addition, the simultaneous application of the binder to the two layer results in the fiber mat being free of a concentrated binder layer at the interface of the two layers. Conventional fiber mats typically include a binder concentration at the interface between layers because the fiber layers are formed separately and then adhered or bonded together via an additional binder. The additional binder bonds the two layers together and is typically concentrated at the interface between the two layers. In contrast, the process described herein is able for form a multiple layer fiber mat construction in which the binder is relatively homogenously or uniformly dispersed throughout the mat rather than being concentrated in one or more areas. In addition, a single binder may be employed to both bond or adhere the layers together and bond or adhere the fibers of the various layers together. Conventional mats commonly require the use of multiple binders in order to bond the fibers of the separate layers together and to subsequently bond the layers together.

At block 508, a coating may optionally be applied atop the layer of the second group of fibers. The coating may be applied via a process that is separate from the application of the binder or the coating may be formed during the binder application process. For example, the binder may include a component (e.g., mica) that is filtered out by the layer of the second group of fibers as the binder is applied to this layer. The component that is filtered out may remain atop or on the exterior surface of the layer of the second group of fibers and form the coating. In such embodiment, the applied binder may bond or adhere the coating to the layer of the second group of fibers. In other embodiments, a separate coating may be applied to the layer of the second group of fibers subsequent to the application of the binder. In such embodiments, the applied binder may bond or adhere the coating to the layer of the second group of fibers or an additional binder may be used to bond or adhere the coating to the layer of the second group of fibers. The coating may be a water resistant coating, a fire-resistant coating, and an abuse-resistant coating, and the like.

In a specific embodiment, the fiber mat that is formed according to the method 500 of FIG. 5 may be a facer for a construction board. In such embodiments, the facer may be applied to the construction board during formation of the construction board. The layer of the first group of fibers may be capable of absorbing a material of the construction board when the facer is positioned atop the construction board during formation of the construction board. The layer of the second group of fibers may partially absorb the material of the construction board, but may block the material from passing or absorbing through the facer to an exterior surface of the second layer. In this manner, the facer may be adhered or bonded with the construction board due to the absorption of the construction board material within the facer, but the material may not be visible on the exterior surface and, therefore, the visual appeal of the facer may be improved. The ability of the facer to block the construction board material from passing or absorbing through the facer to an exterior surface of the second layer is enabled without the use of a coating on the exterior surface of the second layer. As such, a coating is not required to visibly conceal the construction board's material from view, although a coating may be applied to add further visual appeal to the facer as desired. The ability of the second layer to block the construction board's material from passing or absorbing through the facer is due to the decreased porosity or air permeability of the second layer in comparison with the first layer as described herein.

It should be noted that while the method 500 of FIG. 5 is described as simultaneously forming two layers, the method 500 could be employed to simultaneously form three or more layers as described. For example, block 504 could be repeated with a third fluid mixture, a fourth fluid mixture, and the like to form additional layers atop the layer of the second group of fibers. The binder could then be simultaneously applied to each of the layers at block 506 as desired. Thus, the method 500 of FIG. 5 is not limited to two layer constructions.

While several embodiments and arrangements of various components are described herein, it should be understood that the various components and/or combination of components described in the various embodiments may be modified, rearranged, changed, adjusted, and the like. For example, the arrangement of components in any of the described embodiments may be adjusted or rearranged and/or the various described components may be employed in any of the embodiments in which they are not currently described or employed. As such, it should be realized that the various embodiments are not limited to the specific arrangement and/or component structures described herein.

In addition, it is to be understood that any workable combination of the features and elements disclosed herein is also considered to be disclosed. Additionally, any time a feature is not discussed with regard to an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A glass facer for a construction board, comprising:
    a first layer of non-woven web of fibers comprising a first group of coarse glass fibers having an average fiber diameter from about 8 μm to about 25 μm;
    a second layer of non-woven web of fibers comprising a second group of coarse glass fibers mixed with glass microfibers having an average diameter from about 0.5 μm to about 6 μm; and
    a binder configured to simultaneously bind the first group of coarse fibers in the first layer together, the second group of coarse glass fibers and glass microfibers in the second layer together, and the first layer to the second layer;
    wherein the first layer of non-woven web of fibers is configured to absorb a material of the construction board when the glass facer is positioned atop the construction board, and wherein the second layer of non-woven web of fibers is configured to block the material of the construction board from passing through the glass facer to an exterior surface of the second layer of non-woven web of fibers.

2. The glass facer of claim 1, wherein the second group of coarse fibers have an average fiber diameter from about 8 μm to about 25 μm.

3. The glass facer of claim 1, wherein the first group of coarse fibers and the second group of coarse fibers have the same average diameter.

4. The glass facer of claim 1, wherein the glass facer comprises a coating applied atop the exterior surface of the second layer.

5. The glass facer of claim 4, wherein the coating comprises at least one of the following a water resistant coating, a fire-resistant coating, and an abuse-resistant coating.

6. The glass facer of claim 1, wherein the first group of coarse glass fibers have an average fiber diameter of about 13 μm.

7. The glass facer of claim 1, wherein the second group of coarse glass fibers have an average fiber diameter of about 11 μm.

8. The glass facer of claim 1, wherein the glass microfibers have an average fiber diameter of about 3 μm.

9. The glass facer of claim 1, wherein the second group of coarse fibers comprises between about 50 wt. % and 100 wt. % of the total weight of the second layer.

10. The glass facer of claim 1, wherein the glass microfibers comprise between about 80 wt. % and 99 wt. % of the total weight of the second layer.

11. The glass facer of claim 1, wherein the first layer is between 30 and 95 percent of a thickness of the glass facer, and the second layer is between 5 and 50 percent of the thickness of the glass facer.

12. The glass facer of claim 1, wherein the first group of coarse glass fibers, the second group of glass coarse fibers, and the glass microfibers are glass fibers selected from the group consisting of E glass, C glass, T glass, sodium borosilicate glass, and mixtures thereof.

* * * * *